US011294475B1

(12) United States Patent
Pinchon et al.

(10) Patent No.: US 11,294,475 B1
(45) Date of Patent: Apr. 5, 2022

(54) ARTIFICIAL REALITY MULTI-MODAL INPUT SWITCHING MODEL

(71) Applicant: Facebook Technologies, LLC, Menlo Park, CA (US)

(72) Inventors: Etienne Pinchon, London (GB); Jennifer Lynn Spurlock, Seattle, WA (US); Nathan Aschenbach, Mercer Island, WA (US); Gerrit Hendrik Hofmeester, Seattle, WA (US); Roger Ibars Martinez, Seattle, WA (US); Christopher Alan Baker, San Carlos, CA (US); Chris Rojas, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 17/170,825

(22) Filed: Feb. 8, 2021

(51) Int. Cl.
| | |
|---|---|
| *G06F 3/01* | (2006.01) |
| *G06F 3/04815* | (2022.01) |
| *G06F 3/04842* | (2022.01) |
| *G06V 40/10* | (2022.01) |

(52) U.S. Cl.
CPC .............. *G06F 3/017* (2013.01); *G06F 3/013* (2013.01); *G06F 3/04815* (2013.01); *G06F 3/04842* (2013.01); *G06V 40/107* (2022.01)

(58) Field of Classification Search
None
See application file for complete search history.

(56) References Cited

U.S. PATENT DOCUMENTS

| | | |
|---|---|---|
| 6,842,175 B1 | 1/2005 | Schmalstieg et al. |
| 7,701,439 B2 | 4/2010 | Hillis et al. |
| 8,493,383 B1 | 7/2013 | Cook et al. |
| 8,558,759 B1 | 10/2013 | Prada Gomez et al. |

(Continued)

FOREIGN PATENT DOCUMENTS

WO  2018235371  12/2018

OTHER PUBLICATIONS

Hincapie-Ramos, J.D et al. "GyroWand: IMU-based raycasting for augmented reality head-mounted displays." Proceedings of the 3rd ACM Symposium on Spatial User Interaction, Aug. 2015, pp. 89-98.

(Continued)

*Primary Examiner* — Parul H Gupta
(74) *Attorney, Agent, or Firm* — Potomac Law Group, PLLC

(57) ABSTRACT

Embodiments described herein disclose methods and systems directed to input mode selection in artificial reality. In some implementations, various input modes enable a user to perform precise interactions with a target object without occluding the target object. Some input modes can include rays that extend along a line that intersects an origin point, a control point, and an interaction point. An interaction model can specify when the system switches between input modes, such as modes based solely on gaze, using long or short ray input, or with direct interaction between the user's hand(s) and objects. These transitions can be performed by evaluating rules that take context factors such as whether a user's hands are in view of the user, what posture the hands are in, whether a target object is selected, and whether a target object is within a threshold distance from the user.

20 Claims, 11 Drawing Sheets

(56) References Cited

U.S. PATENT DOCUMENTS

| | | |
|---|---|---|
| 8,831,794 B2 | 9/2014 | Persaud et al. |
| 8,902,227 B2 | 12/2014 | Harrison |
| 8,947,351 B1 | 2/2015 | Noble |
| 9,052,161 B2 | 6/2015 | Page |
| 9,117,274 B2 | 8/2015 | Liao et al. |
| 9,159,140 B2 | 10/2015 | Hoof et al. |
| 9,292,089 B1 | 3/2016 | Sadek |
| 9,342,230 B2 | 5/2016 | Bastien et al. |
| 9,412,010 B2 | 8/2016 | Kawaguchi et al. |
| 9,477,368 B1 | 10/2016 | Filip et al. |
| 9,526,983 B2 | 12/2016 | Lin |
| 9,811,721 B2 | 11/2017 | Tang et al. |
| 9,817,472 B2 | 11/2017 | Lee et al. |
| 9,818,231 B2 | 11/2017 | Coffey et al. |
| 9,821,224 B2 | 11/2017 | Latta et al. |
| 9,886,096 B2 | 2/2018 | Kang et al. |
| 9,940,750 B2 | 4/2018 | Dillavou et al. |
| 10,019,131 B2 | 7/2018 | Welker et al. |
| 10,026,231 B1 | 7/2018 | Gribetz et al. |
| 10,043,279 B1 | 8/2018 | Eshet |
| 10,048,760 B2 | 8/2018 | Abercrombie |
| 10,067,636 B2 | 9/2018 | Palmaro |
| 10,102,676 B2 | 10/2018 | Yajima et al. |
| 10,133,342 B2 | 11/2018 | Mittal et al. |
| 10,163,001 B2 | 12/2018 | Kim et al. |
| 10,168,873 B1 | 1/2019 | Holz et al. |
| 10,181,218 B1 | 1/2019 | Goetzinger, Jr. et al. |
| 10,220,303 B1 | 3/2019 | Schmidt et al. |
| 10,235,807 B2 | 3/2019 | Thomas et al. |
| 10,248,284 B2 | 4/2019 | Itani et al. |
| 10,303,259 B2 | 5/2019 | Brunner et al. |
| 10,325,184 B2 | 6/2019 | Brunner et al. |
| 10,339,721 B1 | 7/2019 | Dascola et al. |
| 10,423,241 B1 | 9/2019 | Pham et al. |
| 10,451,875 B2 | 10/2019 | Sutherland et al. |
| 10,473,935 B1 | 11/2019 | Gribetz et al. |
| 10,481,755 B1 | 11/2019 | Ngo et al. |
| 10,521,944 B2 | 12/2019 | Sareen et al. |
| 10,558,048 B2 | 2/2020 | Fukuda et al. |
| 10,592,067 B2 | 3/2020 | Merdan et al. |
| 10,617,956 B2 | 4/2020 | Black et al. |
| 10,649,212 B2 | 5/2020 | Burns et al. |
| 10,657,694 B2 | 5/2020 | Sharma et al. |
| 10,726,266 B2 | 7/2020 | Sharma et al. |
| 10,802,600 B1 | 10/2020 | Ravasz et al. |
| 10,818,071 B1 | 10/2020 | Hoppe et al. |
| 10,818,088 B2 | 10/2020 | Jones et al. |
| 10,824,247 B1 | 11/2020 | Henrikson et al. |
| 10,890,653 B2 | 1/2021 | Giusti et al. |
| 10,922,894 B2 | 2/2021 | Sculli et al. |
| 10,970,936 B2 | 4/2021 | Osborn et al. |
| 11,030,237 B2 | 6/2021 | Itani et al. |
| 11,077,360 B2 | 8/2021 | Ohashi |
| 2004/0224670 A1 | 11/2004 | Hull et al. |
| 2007/0003915 A1 | 1/2007 | Templeman |
| 2008/0089587 A1 | 4/2008 | Kim et al. |
| 2010/0306716 A1 | 12/2010 | Perez |
| 2011/0009241 A1 | 1/2011 | Lane et al. |
| 2011/0032257 A1 | 2/2011 | Peterson et al. |
| 2011/0154266 A1 | 6/2011 | Friend et al. |
| 2011/0254846 A1 | 10/2011 | Lee et al. |
| 2011/0267265 A1 | 11/2011 | Stinson |
| 2011/0310220 A1 | 12/2011 | McEldowney |
| 2012/0069168 A1 | 3/2012 | Huang et al. |
| 2012/0143358 A1 | 6/2012 | Adams et al. |
| 2012/0157198 A1 | 6/2012 | Latta et al. |
| 2012/0188279 A1 | 7/2012 | Demaine |
| 2012/0206345 A1 | 8/2012 | Langridge |
| 2012/0256967 A1 | 10/2012 | Baldwin et al. |
| 2012/0275686 A1 | 11/2012 | Wilson et al. |
| 2012/0293544 A1 | 11/2012 | Miyamoto et al. |
| 2013/0002551 A1 | 1/2013 | Imoto et al. |
| 2013/0022843 A1 | 1/2013 | Tohda |
| 2013/0026220 A1 | 1/2013 | Whelihan |
| 2013/0042296 A1 | 2/2013 | Hastings et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0211843 A1 | 8/2013 | Clarkson |
| 2013/0265220 A1 | 10/2013 | Fleischmann et al. |
| 2014/0125598 A1 | 5/2014 | Cheng et al. |
| 2014/0168217 A1 | 6/2014 | Kim et al. |
| 2014/0201666 A1 | 7/2014 | Bedikian et al. |
| 2014/0236996 A1 | 8/2014 | Masuko et al. |
| 2014/0357366 A1 | 12/2014 | Koganezawa et al. |
| 2014/0375691 A1 | 12/2014 | Kasahara |
| 2015/0009238 A1 | 1/2015 | Kudalkar |
| 2015/0035746 A1 | 2/2015 | Cockburn et al. |
| 2015/0054742 A1 | 2/2015 | Imoto et al. |
| 2015/0061998 A1 | 3/2015 | Yang et al. |
| 2015/0062160 A1 | 3/2015 | Sakamoto et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0260474 A1 | 9/2015 | Rublowsky et al. |
| 2015/0261659 A1 | 9/2015 | Bader et al. |
| 2016/0027212 A1 | 1/2016 | Veiga et al. |
| 2016/0110052 A1 | 4/2016 | Kim et al. |
| 2016/0147308 A1 | 5/2016 | Gelman et al. |
| 2016/0170603 A1* | 6/2016 | Bastien .................. G06F 3/005 348/49 |
| 2016/0171771 A1 | 6/2016 | Pedrotti et al. |
| 2016/0210784 A1 | 7/2016 | Ramsby et al. |
| 2016/0378291 A1 | 12/2016 | Pokrzywka |
| 2017/0060230 A1 | 3/2017 | Faaborg et al. |
| 2017/0060319 A1 | 3/2017 | Seo et al. |
| 2017/0109936 A1 | 4/2017 | Powderly et al. |
| 2017/0123487 A1 | 5/2017 | Hazra et al. |
| 2017/0139478 A1 | 5/2017 | Jeon et al. |
| 2017/0192513 A1 | 7/2017 | Karmon et al. |
| 2017/0203213 A1 | 7/2017 | Stafford |
| 2017/0205892 A1 | 7/2017 | Petrovskaya et al. |
| 2017/0236320 A1 | 8/2017 | Gribetz et al. |
| 2017/0237789 A1 | 8/2017 | Harner et al. |
| 2017/0243401 A1 | 8/2017 | Tanaka et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0364198 A1 | 12/2017 | Yoganandan et al. |
| 2017/0372499 A1 | 12/2017 | Lalonde |
| 2018/0005443 A1 | 1/2018 | Poulos et al. |
| 2018/0024623 A1 | 1/2018 | Faaborg et al. |
| 2018/0059901 A1 | 3/2018 | Gullicksen |
| 2018/0095635 A1 | 4/2018 | Valdivia et al. |
| 2018/0107278 A1 | 4/2018 | Goel et al. |
| 2018/0113599 A1 | 4/2018 | Yin |
| 2018/0144556 A1 | 5/2018 | Champion et al. |
| 2018/0224928 A1 | 8/2018 | Ross et al. |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0349690 A1 | 12/2018 | Rhee et al. |
| 2018/0357780 A1 | 12/2018 | Young et al. |
| 2019/0033989 A1 | 1/2019 | Wang et al. |
| 2019/0050062 A1 | 2/2019 | Chen et al. |
| 2019/0094981 A1 | 3/2019 | Bradski et al. |
| 2019/0097981 A1 | 3/2019 | Koyun et al. |
| 2019/0102941 A1 | 4/2019 | Khan et al. |
| 2019/0107894 A1 | 4/2019 | Hebbalaguppe et al. |
| 2019/0130655 A1 | 5/2019 | Gupta et al. |
| 2019/0188895 A1 | 6/2019 | Miller, IV et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0310757 A1 | 10/2019 | Lee et al. |
| 2019/0355272 A1 | 11/2019 | Nusbaum et al. |
| 2019/0362557 A1 | 11/2019 | Lacey et al. |
| 2019/0362562 A1 | 11/2019 | Benson |

(56) References Cited

U.S. PATENT DOCUMENTS

| | | |
|---|---|---|
| 2019/0369391 A1 | 12/2019 | Cordesses et al. |
| 2019/0377416 A1 | 12/2019 | Alexander |
| 2020/0001461 A1 | 1/2020 | Cappello et al. |
| 2020/0033957 A1 | 1/2020 | Bieglmayer |
| 2020/0064908 A1 | 2/2020 | Boucher |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0103521 A1 | 4/2020 | Chiarella et al. |
| 2020/0134895 A1 | 4/2020 | Pollard et al. |
| 2020/0143598 A1 | 5/2020 | Riordan |
| 2020/0218423 A1* | 7/2020 | Ohashi ............... G06F 3/017 |
| 2020/0225736 A1 | 7/2020 | Schwarz et al. |
| 2020/0225758 A1 | 7/2020 | Tang et al. |
| 2020/0225830 A1* | 7/2020 | Tang ............... G06F 3/04842 |
| 2020/0226814 A1 | 7/2020 | Tang et al. |
| 2020/0241646 A1 | 7/2020 | Hebbalaguppe et al. |
| 2020/0249746 A1 | 8/2020 | Gkaintatzis |
| 2020/0272231 A1 | 8/2020 | Klein et al. |
| 2020/0379576 A1 | 12/2020 | Chen et al. |
| 2021/0012113 A1 | 1/2021 | Petill et al. |

OTHER PUBLICATIONS

Schweigert, R. et al. "EyePointing: A gaze-based selection technique." Proceedings of Mensch and Computer, Sep. 8, 2019, pp. 719-723.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting". <www.techfak.uni-bielefeld.de/~tpfeiffe/lehre/VirtualReaiity/interaction/ray_casting.html> [accessed Apr. 7, 2020], 2 pages.

"Unity Gets Toolkit for Common AR/VR interactions" <youtu.be/ZPhv4qmT9EQ> [accessed Apr. 7, 2020] Unity XR interaction Toolkit Preview Dec. 19, 2019.

International Search Report and Written Opinion, PCT Patent Application PCT/US2020/051763, dated Feb. 3, 2021, 11 pages.

Katz, "Extending Web Browsers with a Unity 3D-Based Virtual Worlds Viewer", 2011, IEEE Computer Society, pp. 15-21 (Year: 2011).

Qiao et al. "Web AR: A Promising Future for Mobile Augmented Reality—State of the Art, Challenges, and Insights," Apr. 2019, vol. 107, No. 4 IEEE, pp. 651-666.

Srinivasa, et al. "Augmented Reality Adaptive Web Content," IEEE Annual Consumer Communications & Networking Conference (CCNC) 2016, pp. 1-4.

International Search Report and Written Opinion for International Application No. PCT/US2020/052976, dated Dec. 11, 2020, 10 Pages.

International Search Report and Written Opinion for International Application No. PCT/US2020/058648, dated Feb. 23, 2021, 12 Pages.

International Search Report and Written Opinion for International ApplicationNo. PCT/US2021/038826,dated Oct. 19, 2021, 12 pages.

* cited by examiner

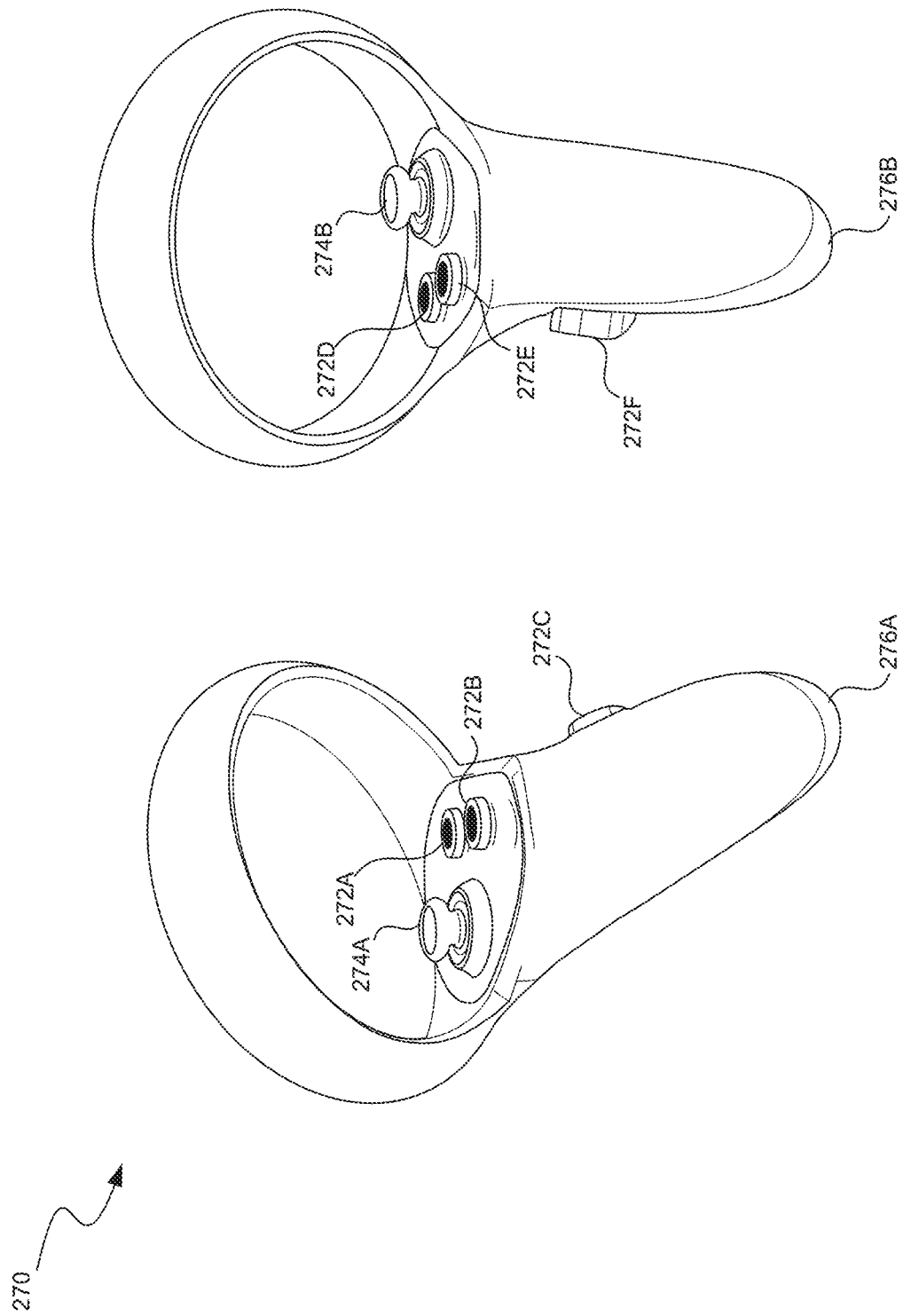

US 11,294,475 B1

ARTIFICIAL REALITY MULTI-MODAL INPUT SWITCHING MODEL

TECHNICAL FIELD

The present disclosure is directed to methods and systems for input mode selection in artificial reality.

BACKGROUND

Artificial reality environments can be provided by a variety of systems, such as projectors, head mounted displays, "cave" systems, etc. Users can interact with an artificial reality environment such as by selecting objects, moving, rotating, resizing, actuating controls, changing colors or skins, defining interactions between virtual objects, setting virtual forces to act on virtual objects, or practically any other imaginable action. Various interaction modalities exist for these taking such actions in an artificial reality environment. For example, some systems can employ one or more of gaze controls, hand-held hardware devices, gesture controls, wearable devices (e.g., wrist bands), voice controls, etc. For example, in some cases a user operating in an artificial reality environment can interact with objects using commands issued via hand-held controller devices. In some cases, an artificial reality system can employ multiple of such interaction modalities.

In an artificial reality environment, some or all of the objects a user sees and interacts with are "virtual objects," i.e., representations of objects generated by a computing system that appear in an environment. Virtual objects in an artificial reality environment can be presented to the user by a head-mounted display, a mobile device, a projection system, or another computing system. Often, users can interact with virtual objects using controllers and/or gestures. In some cases, the artificial reality system can track user interactions with "real objects" that exist independent of the artificial reality system controlling the artificial reality environment. For example, a user can select a real object and add a virtual overlay to change the object's color or some other way the object is presented to the user, cause it to affect other virtual objects, etc. As used herein, unless otherwise specified, an "object" can be a real or virtual object. Some 3D systems allow users to interact with objects using projections, or "rays," which in many cases are lines cast out from a user's hand. Various systems have defined different types of rays, such as straight rays, curved rays, or rays that emanate from different body parts or other user-controlled elements.

BRIEF DESCRIPTION OF THE DRAWINGS

FIG. 2C illustrates controllers, which, in some implementations, a user can hold in one or both hands to interact with an artificial reality environment.

The techniques introduced here may be better understood by referring to the following Detailed Description in conjunction with the accompanying drawings, in which like reference numerals indicate identical or functionally similar elements.

DETAILED DESCRIPTION

Figure 1:
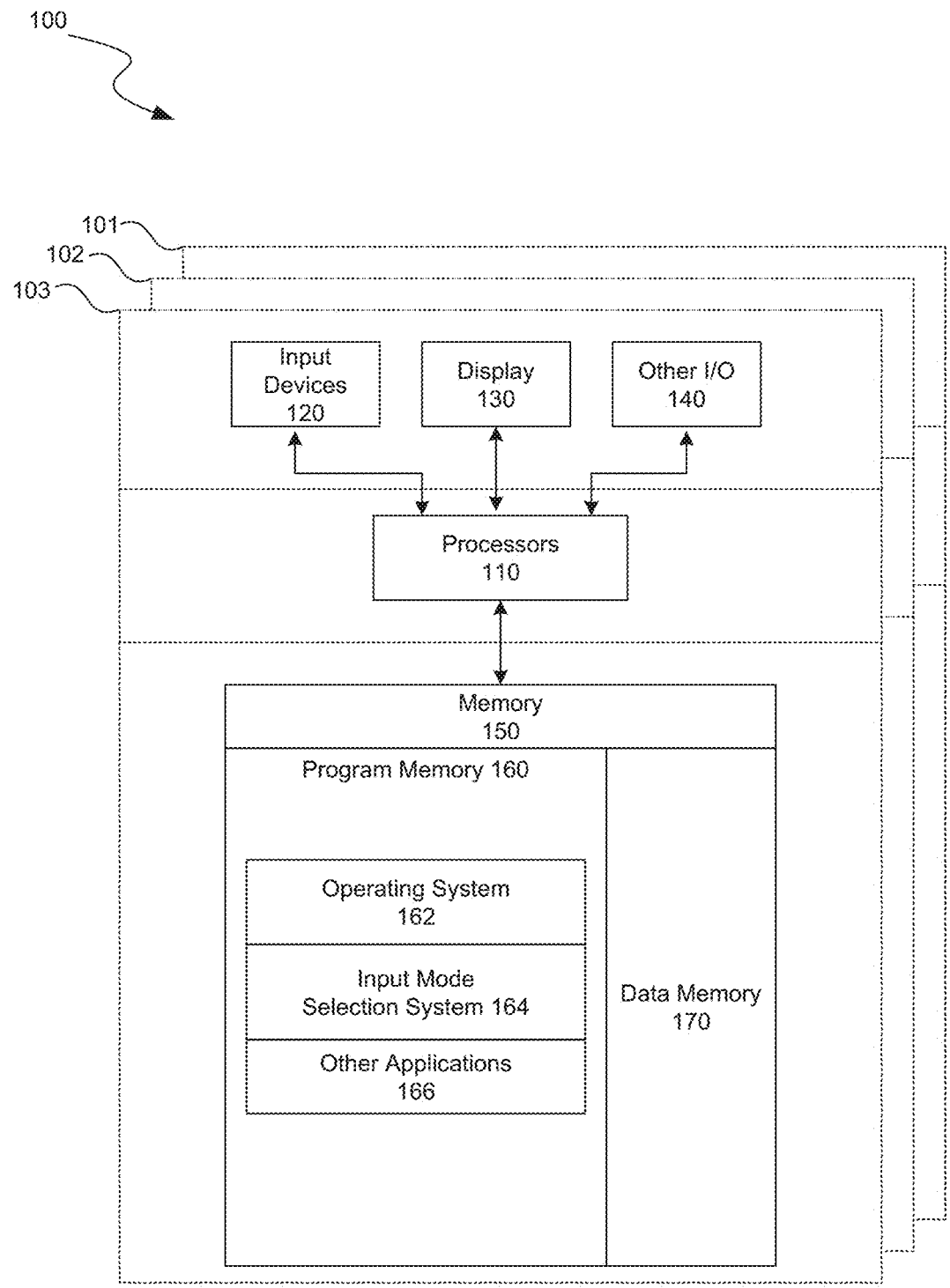
FIG. 1 is a block diagram illustrating an overview of devices on which some implementations of the present technology can operate.

Aspects of the present disclosure are directed to an input mode selection system. In some implementations, the input mode selection system can automatically, based on selection rules evaluated using context factors, select between two or more input modes, such as eye gaze selection, short or long ray casting, or direct manipulation of objects. Such context factors for the input mode selection system to make this input mode selection can include whether one or more of the user's hands are in view; whether a hand is in a particular posture corresponding to an input mode; whether a target object has been selected; and, when a target object has been selected, whether that target object is within a threshold distance of the user. For example, the input mode selection system can evaluate a first rule that transitions to eye gaze input mode when neither of the user's hands are in view; can evaluate a second rule that switches to short or long ray input mode when a user's hand is in view and is in a posture mapped to ray inputs and can further evaluate a third rule that switches to short ray input mode when a target object is selected and it is within a threshold distance of the user and otherwise switches to a long input mode; and can evaluate a fourth rule that, when the user's hand is in view, is not in the ray input posture, a target object is selected, and the target object is within a threshold distance of the user switches to a direct hand input mode and otherwise switches to a gaze input mode. Additional details on selection rules evaluated using context factors are provided below in relation to FIG. 5.

Eye gaze input mode can include tracking head position and/or eye gaze direction of the user to determine input direction and the target object that a ray will be cast at. In some cases, the gaze input action can be signaled using a gaze timer (e.g., a gaze held without moving above a time threshold amount, such as every threshold amount of time 0.5, 1, 2, or 3 seconds). In other cases, the gaze input action can be signaled with an eye blink. In other cases, the gaze input mode activation can be a hand gesture recognized with a wearable (e.g., bracelet can recognize tap gesture from inertial measurement unit (IMU) data, electromagnetic motion data, or analysis of wrist muscle contraction). The eye gaze selection can be a fast, efficient, and natural way to select target objects, requiring less user energy as compared to requiring the user to lift her hand into view to select an object.

Direct input mode can include the user physically moving her hand to contact the target objects. For example, he direct input mode includes direct contact between a user's hand and a real or virtual object (e.g., pressing a virtual or physical button, grasping an object, etc.) to interact with the target object.

Long ray input mode can include providing a ray of a specified length or a length extending until it intersects with an object. The long ray input mode can enable the user to interact with real or virtual objects outside the user's reach by casting a ray for interacting with the objects.

Short ray input mode can include casing a ray that extends, for a particular distance, along a line that intersects an origin point (e.g., in the user's palm) and a control point (e.g., between the user's thumb tip and index finger tip), ending at an interaction point (e.g., the point of the ray that contacts the target object). In some cases, the short ray can extend a set distance, such as 3, 6, or 12 inches, from the control point. In other cases, the distance can be dynamic, such as to extend the ray the distance from the user's hand to a selected target object or surface or based on the distance between the user's hands. Additional details on a short ray interaction mode are provided below in relation to FIGS. 6-9.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing artificial reality systems for casting rays that select and interact with objects in artificial reality environments. Other existing artificial reality systems provide for direct object manipulation. However, these systems can offer imprecise interactions due to the user's hands occluding the object the user is trying to interact and/or being difficult to control due to small user movements causing large changes in the location of a long ray. For example, tracking of a user's bare hands may occlude the object being manipulated, such as moving a piece in an artificial reality environment chess game. As another example, a system that only has long rays cast out from a hand can be difficult to control for interactions with close objects. Thus, such existing artificial reality systems are imprecise and/or provide limited functionality in certain circumstances. Furthermore, while some existing artificial reality systems may allow for multiple input modes, they fail to provide automated mode selections that are natural while allowing for effective object manipulation.

The input mode selection system and processes described herein overcome these problems associated with conventional artificial reality interaction techniques and provide users with greater control over object interactions, offer more functionality, and be more natural and intuitive than interactions in existing artificial reality systems. A short ray input mode can provide rays that extend, for a particular distance, along a line that intersects an origin point (e.g., in the user's palm) and a control point (e.g., between the user's thumb tip and index finger tip), extending to an interaction point (e.g., point of the short ray that can interact with a target object). This short ray input mode enables a user to perform precise interactions with a target object that is near the user, without occluding the target objects. Furthermore, short rays do not suffer from the cognitive disconnect experienced in direct interaction modes. For example, when a user performs a "grab" gesture of a virtual object, but does not actually feel the object, and this lack of haptic feedback is a stark reminder that the object isn't real. However, when using short rays to interact with nearby objects, the user is not expecting to feel contact with virtual objects, and thus does not experience this cognitive disconnect. Short rays can have the same (single) focal plane as the target object. Having the same focal plane can permit the user to interact with the target object with greater accuracy and precision than when the short ray and object are on different focal planes.

An interaction model can specify when the system switches between input modes including a mode based solely on gaze, input using long rays, input using short rays, and direct object interaction. By defining this interaction model in a manner that accounts for multiple use cases and technological limitations, the input mode selection system is more effect, easier to use, more precise, and provides faster interactions than existing artificial realty systems. For example, the interaction model described below selects modes based on whether they input mode selection system can detect what the user's hands are doing, which positions the user's hands are in, and where target objects are. These determinations allow the input mode selection system to provide an interaction mode that is appropriate to the current context, accurate both for user control and for the input mode selection system to interpret, and easy for the user to understand and natural to control.

Several implementations are discussed below in more detail in reference to the figures. FIG. 1 is a block diagram illustrating an overview of devices on which some implementations of the disclosed technology can operate. The devices can comprise hardware components of a computing system 100 that select and switch between multi-modal inputs in artificial reality. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, input mode selection system 164, and other application programs 166. Memory 150 can also include data memory 170 that can include ray data, short and long ray input data, gaze input data, hand input data, distance data, gesture data, posture data, user interaction data, threshold data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
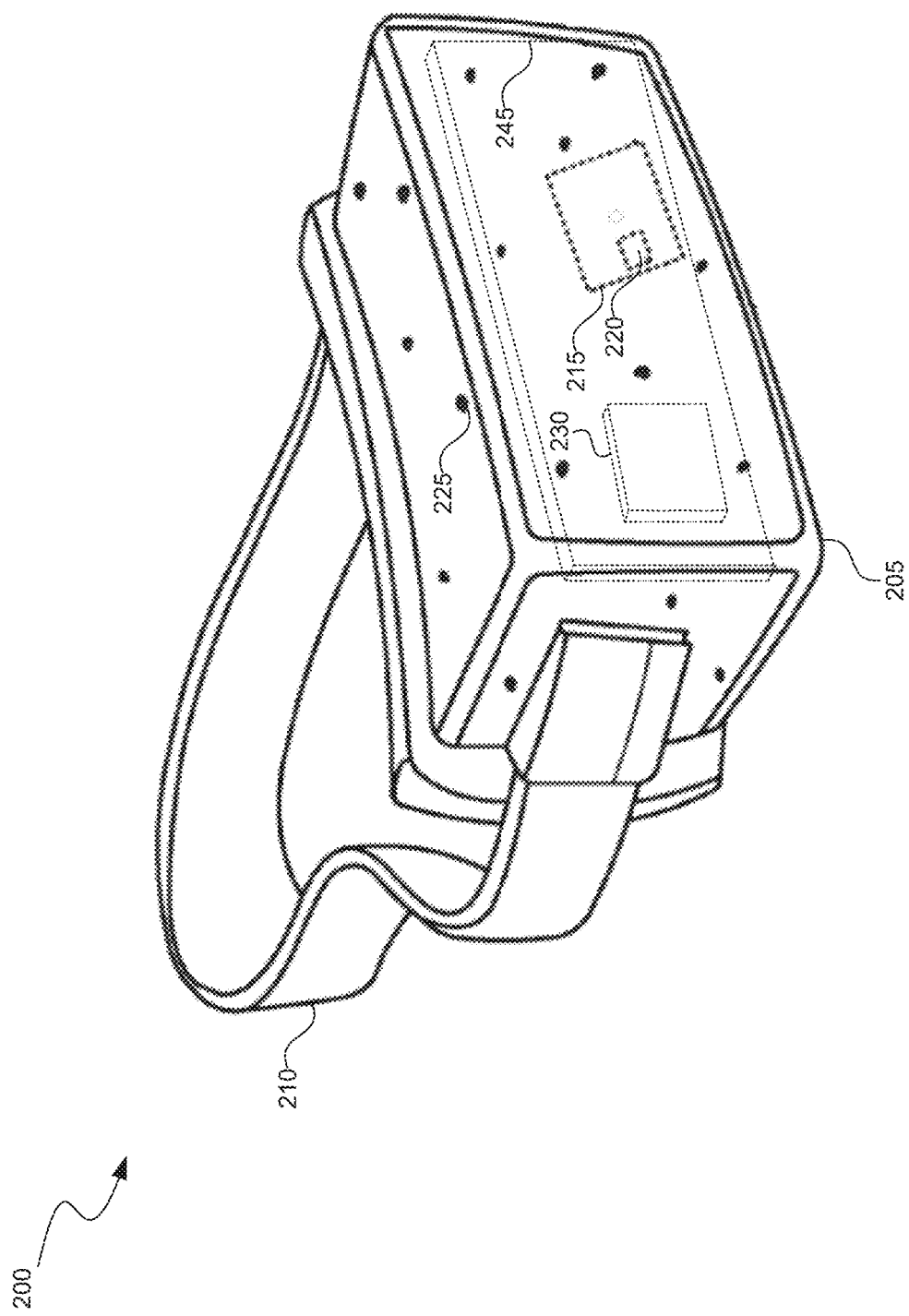
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
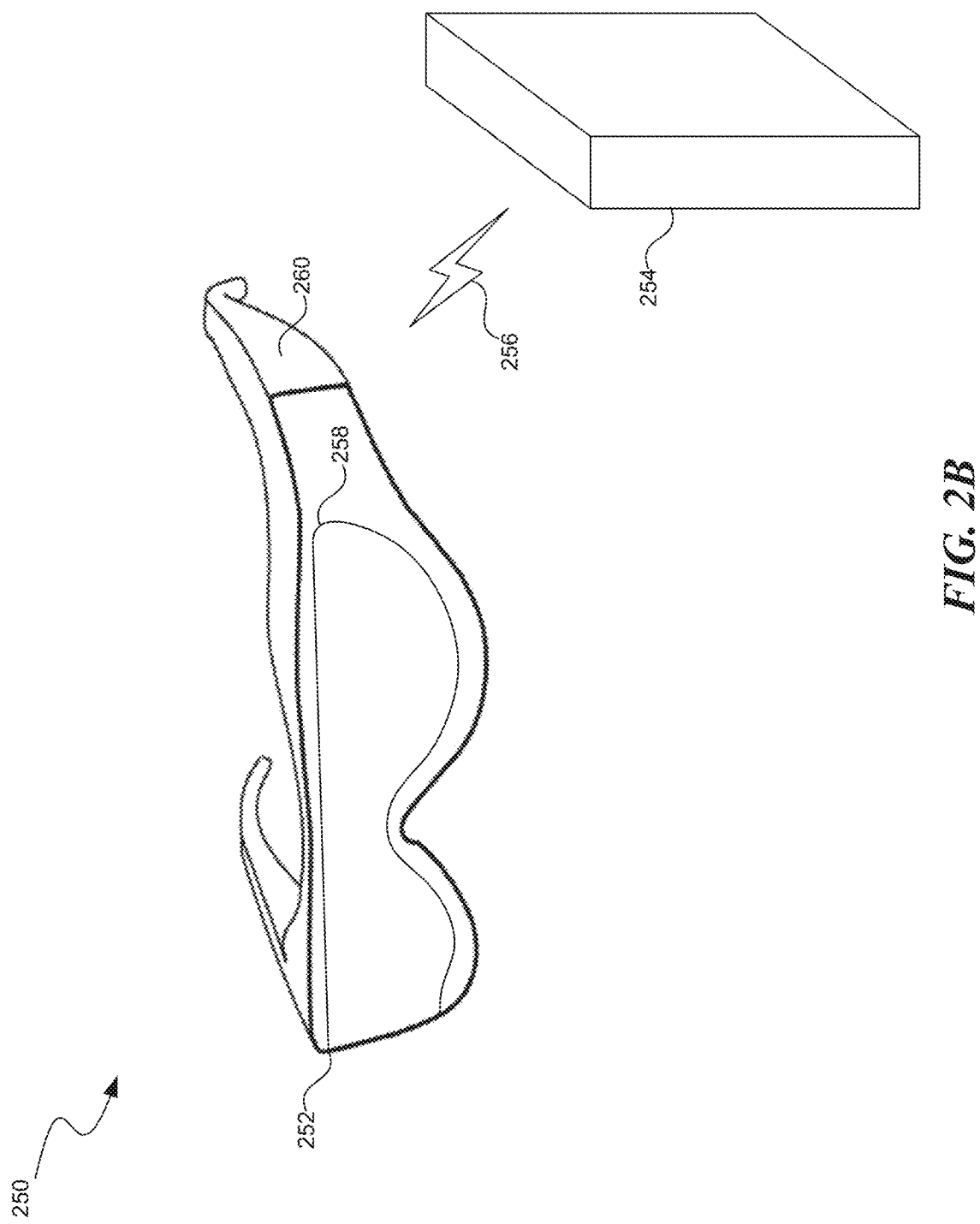
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
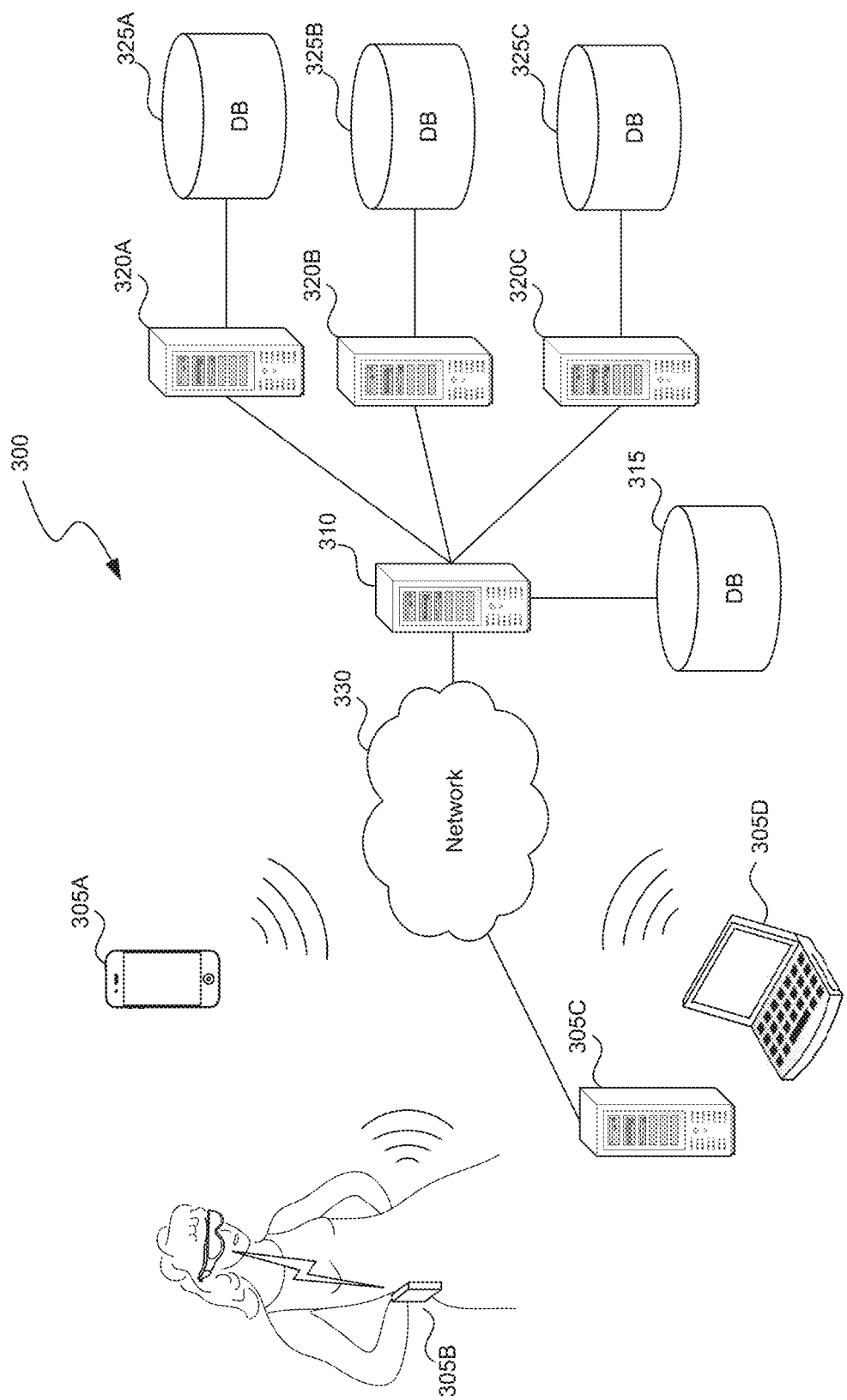
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
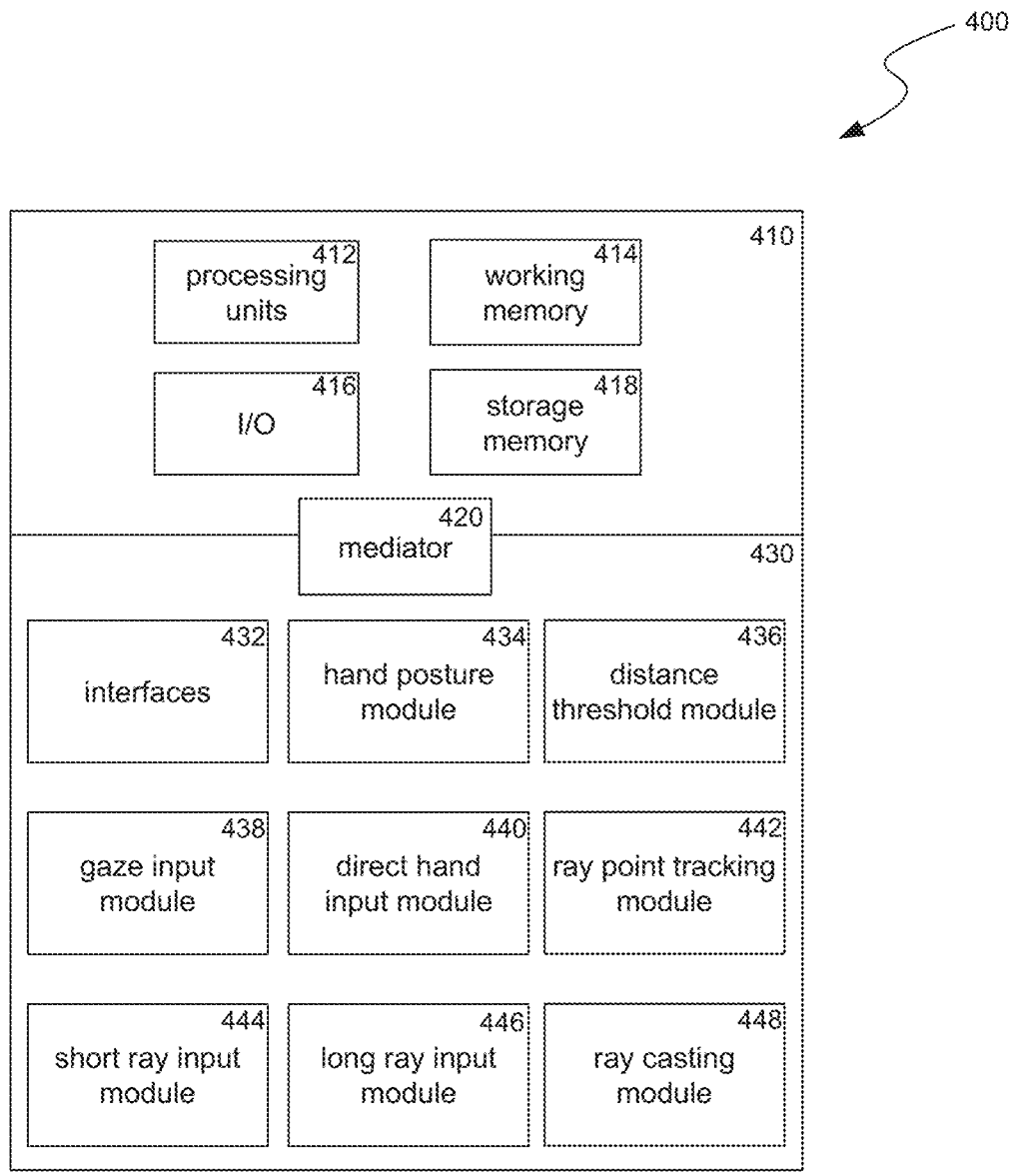
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for input mode selection in artificial realty. Specialized components 430 can include hand posture module 434, distance threshold module 436, gaze input module 438, direct hand input module 440, ray point tracking module 442, short ray input module 444, long ray input module 446, ray casting module 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some embodiments, the hand posture module 434 is configured to identify whether a user hand is in view of one or more posture capturing cameras of an artificial reality device. The hand posture module 434 can monitor hand positions of a user's hand using one or more images captured by the one or more posture capturing cameras, identify hand postures of the user, and determine if the hand postures are ray postures. Additional details on hand postures are provided below in relation to blocks 502 and 504 in FIG. 5.

In some embodiments, the distance threshold module 436 is configured to determine if the target object is within a threshold distance (e.g., every threshold amount of distance, such as every 0.5, 1, 2, 3 inches, etc.) from the user. In some cases, the threshold distance is the distance between the user and the selected target object. The threshold distance can be a user determined value or a system default value. Distance threshold module 436 can determine the distance threshold based on the arm span (e.g., a percentage value of the user's arm length) of the user, such as whether the target object is within arm's reach of the user. Additional details on distance thresholds are provided below in relation to blocks 506 and 512 in FIG. 5.

In some embodiments, the gaze input module 438 is configured to determine the eye gaze direction of the user and what object the user is looking at. In various implementations, the gaze input module 438 can activate gaze input mode when the user's hands are not in view, when the user's hands are in view but not in a ray casting posture, or the user's hands are in view but a direct input mode is not selected (e.g., when no target object is selected or it is not within the threshold distance from the user). The gaze input module 438 can track head position and/or eye gaze direction of the user to determine input direction and the target object that a ray will be cast at. In some cases, the gaze input action can be signaled using a gaze timer (e.g., a gaze held without moving above a time threshold amount, such as every threshold amount of time 0.1, 0.5, or 1 second). In other cases, the gaze input direction can be signaled with an eye blink. In other cases, the gaze input activation can be a hand gesture recognized with a wearable (e.g., bracelet can recognize tap gesture from IMU data, electromagnetic motion data, or analysis of wrist muscle contraction). Additional details on gaze input are provided below in relation to block 510 in FIG. 5.

In some embodiments, the direct hand input module 440 is configured to select a direct input mode when the user's hand is in view, it is not in a posture mapped to ray casting, and a target object is selected and is within a threshold distance (e.g., within the arm-span) of the user. The direct hand input module 440 can use direct contact between a user's hand and a real or virtual object (e.g., pressing a virtual or physical button, grasping an object, etc.) to interact with the target object. Additional details on hand input are provided below in relation to block 508 in FIG. 5.

In some embodiments, the ray point tracking module 442 is configured to track an origin point, a control point, and an interaction point of a ray. The origin point can be the point the ray begins. The origin point can be, for example, where the thumb connects to the palm, the midpoint between the index knuckle and the thumb knuckle, the center of palm, or a specified offset from one of these points. The control point can be the point the ray is cast out from the user (e.g., one of the user's fingertip). In an example, when the ray casting gesture is a pinch or open pinch, the control point can be the point where thumb tip touches another (e.g., index) fingertip or a point between the tip of one of the user's fingers and the tip of the user's thumb when held apart. The interaction point can be the point at the end of the line (e.g., a particular distance from the control point) that the user can control by moving the origin and control points to touch/contact/interact with the target object. Additional details on ray point tracking are provided below in relation to blocks 604 and 606 in FIG. 6.

In some embodiments, the short ray input module 444 is configured to provide a ray of a specified length for interacting with the target object. In some cases, the specified length is a pre-determined length, such as 3, 6, or 12 inches. In other cases, the short ray input module 444 can determine the specified length based on a distance to a target object, to a particular surface, a distance between the user's hands, or based on the arm span (e.g., a percentage value of the user's arm length) of the user, such as whether the target object is within arm's reach of the user. The short ray input module 444 can enable the user to interact with precision with nearby target object without the user's hand occluding the target object. Additional details on short ray input are provided below in relation to block 516 in FIG. 5.

In some embodiments, the long ray input module 446 is configured to provide a ray of a specified length or a length extending until it intersects with an object. The long ray input module 446 can enable the user to interact with an object outside the user's reach. Additional details on long ray input are provided below in relation to block 514 in FIG. 5.

In some embodiments, the ray casting module 448 is configured to cast a ray (of a type selected by long ray input module 446 or short ray input module 444), of the specified length from the origin point to an interaction point, along a line connecting the origin point and the control point (as tracked by the ray point tracking module 442). In some cases, the ray has an extension for selecting target objects when the target object is beyond the length of the default ray. Additional details on ray casting are provided below in relation to block 606 in FIG. 6.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
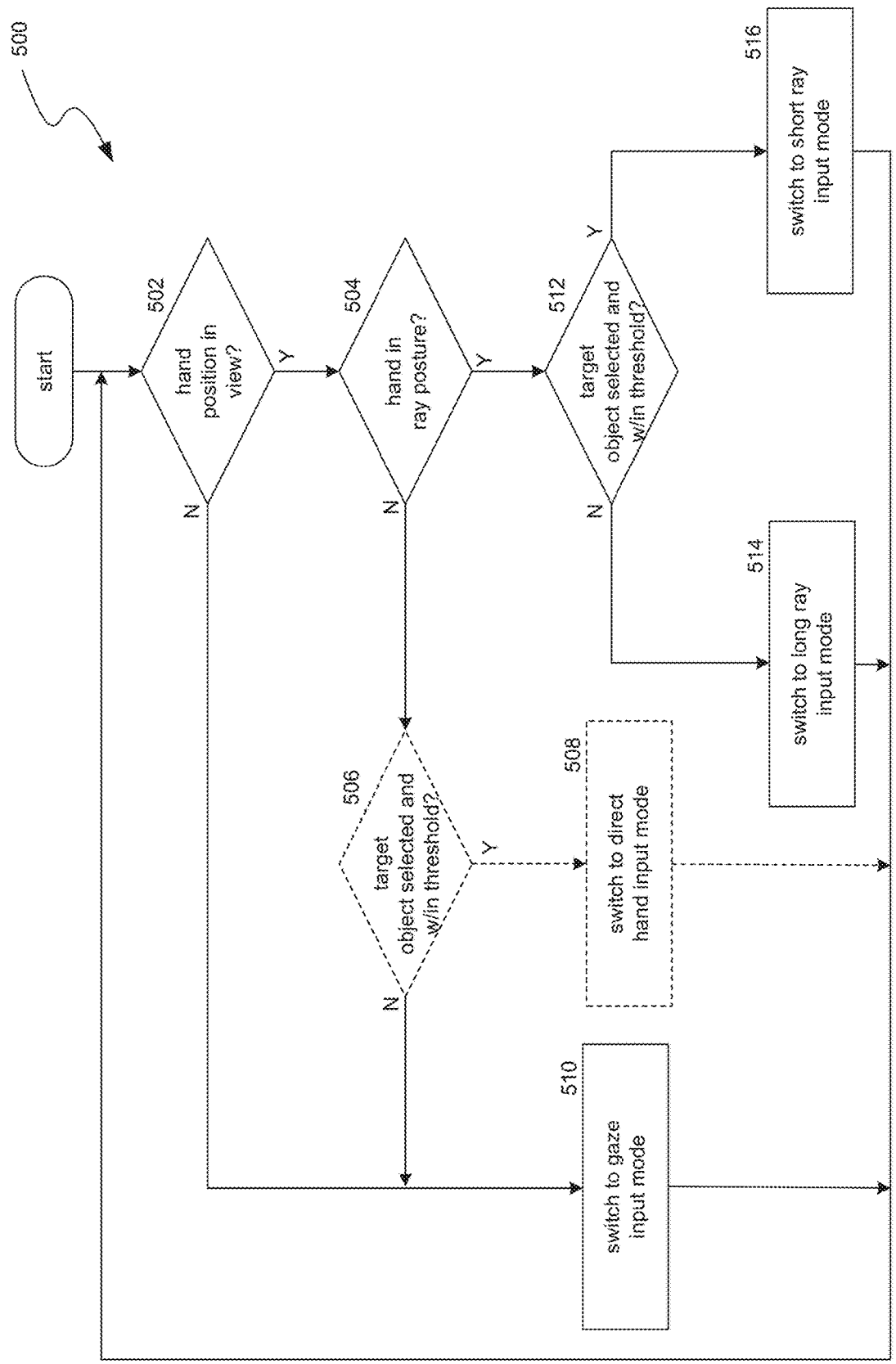
FIG. 5 is a flow diagram illustrating a process used in some implementations of the present technology for input mode selection.

FIG. 5 is a flow diagram illustrating a process 500 used in some implementations for input mode selection in artificial reality. Process 500 can be triggered by the user activating an input mode, the user putting on an artificial reality device (e.g., headset), an activation gesture by the user, a button press on a control device, the user selecting a target object, or when an artificial realty system is powered on (e.g., process 500 can be always operating and the user entering the artificial reality environment triggers input mode selection). Process 500 can be performed locally on the artificial reality device or performed by cloud-based device(s) that can support user input mode selection.

At block 502, process 500 can identify that a user hand is in view of one or more posture capturing cameras of an artificial reality device. In some cases, the posture capturing cameras monitor the user's body to determine whether they can identify the user hands. In some cases, the determination of whether the user's hands are in view can further include a determination as to whether the user can see his or her hands, i.e., monitoring whether the user's field of view show the user's hands. Input mode selection for a mode based on hand input is more likely natural to the user if the user can see her own hands. Thus, while the posture capturing cameras may be able to view more of the user's environment than the user can see, the determination at block 502 may be limited to the user's field of view. For example, process 500 can first attempt to identify a user hand using posture capturing cameras and then may determine, depending on a tracked head and/or gaze position of the user, if the user's field of view includes that hand position. In some implementations, contextual conditions such as lighting or capture quality can factor into whether the posture capturing cameras can determine the user's hand position. For example, process 500 may determine that while the user's hand are in view of the cameras the lighting or speed of the hand movements is such that the system cannot determine a hand posture with sufficient accurately and thus may result in a No decision at block 502. If process 500 is unable to identify the user hand position is unable to identify the user hand position with sufficient accuracy (or in some implementations if the user's hands are not in the user's determined field of view), process 500 can proceed to block 510 otherwise process 500 can continue to block 504.

At block 510, process 500 can switch to or enable a gaze input mode which uses the eye gaze direction (which may be further based on a tracked head position) of the user to determine the input direction of the user (e.g., where the user is looking, such as at a target object). While user gaze can specify a direction in the gaze input mode, selection/interaction inputs can be signaled through a gaze timer (e.g., gaze held without moving above a time threshold amount, such as every threshold amount of time 0.1, 0.5, or 1 second), an eye blink or a hand gesture recognized with a wearable (e.g., bracelet can recognize tap gesture from inertial measurement unit (IMU) data or analysis of wrist muscle contraction). In some cases, eye gaze is the default input mode for selecting target objects, when a target object is selected (e.g. with a pinch gesture) but the user's hands are not in-view or the target object is beyond a threshold distance from the user.

The process 500 can monitor the user hand posture continuously or periodically. A hand "posture" as used herein refers to a hand location and/or pose. For example, a hand posture can comprise one or both of where the hand is in an artificial reality environment and/or the shape the hand is making. Certain hand postures can be previously identified as "gestures," where the gesture is identified when the hand posture matches to a threshold amount. The processes described herein can monitor hand postures in different manners. In some cases, hand postures can be identified using input from external facing cameras that capture depictions of user hands. In other cases, hand postures can be based on input from a wearable device such as a glove or wristband that tracks aspects of the user's hands. In some implementations, input can be interpreted as postures mapped as certain gestures by applying the input to a machine learning model trained to identify hand postures and/or gestures based on such input. In some implementations, heuristics or rules can be used to analyze the input to identify hand postures and/or gestures. Process 500 can monitor hand positions of the user's hands using one or more images captured by the one or more posture capturing cameras. Process 500 can identify a hand posture of a user based on the monitoring the hand positions of the user. At block 504, process 500 can determining whether the hand posture is a ray posture (e.g., pinching together of fingers on the user's hand, an "open pinch" where fingers on the user's hand are extended but do not touch, finger pointing, thumbs up posture, or other gestures or postures made by the user hand or hands). The ray posture can be any posture or gesture of the mapped to ray casting. If the user's hand is in the ray posture, process 500 can continue to block 512. If the user's hand is not in the ray posture, process 500 can continue to block 506 (or if block 506 is not performed, to block 510, which is discussed above).

While as noted above, any block may not be performed, blocks 506 and 508 are illustrated in dashed lines to specifically call-out some implementations where these block are skipped and the No branch from block 504 goes to block 510 instead of block 506. At block 506, process 500 can determine whether a target object is selected and, if so, whether it is within a threshold distance (e.g., a specified distance such as 3 feet or a distance based on a determined arm-span of the user) from the user. The user can select the target object with a previous interaction (e.g., a gaze input mode selection, air-tap, hand gesture, control device input, etc.). In some implementations, the user selects the target object with the ray posture by pointing the ray posture at an object. The threshold distance can be a user determined constant value, or a system default value or dynamic value. In some cases, such a dynamic threshold distance is determined based on the arm span (e.g., a percentage value of the user's arm length) of the user. If there is a selected target object and it is within the threshold distance, process 500 can proceed to block 508; otherwise process 500 can process to block 510 (discussed above).

At block 508, in response to determining the target object is selected and is within the threshold distance from the user, process 500 can switch to or enable a direct hand input mode. The direct hand input mode can use a hand contact and hand movement (e.g., pressing a virtual or physical button, grabbing an object, etc.) to interact with the target object. The direct input mode can allow the user to physically move her hand to contact the target objects. The direct input mode may not use rays to interact with the target object.

Proceeding from the Yes branch from block 504, where process 500 determined the hand posture is a ray posture, process 500 can arrive at block 512. At block 512, process 500 can determine whether a target object has been selected and, if so, whether that target object is within a threshold distance (e.g., 2 or 3 feet) from the user. The threshold distance can be user specified value or a system default value. In some cases, the threshold distance is determined based on the arm span (e.g., a percentage value of the user's arm length) of the user, such as whether the target object is within arm's reach of the user. The distance from the user to the target object can determine the input mode to cast a ray that process 500 selects. In an example, process 500 uses a long ray input mode to cast a ray when the target object is outside the reach of the user or when no target object is selected. In another example, process 500 uses a short ray input mode to cast a ray when the target object is within the threshold.

At block 514, process 500, in response to determining a target object is not selected or is not within the threshold distance, can switch to or enable a long ray input mode. The long ray input mode casts a ray for interacting with real or virtual objects. The long ray input mode can enable the user to interact with objects without the user's hand occluding the objects. The long ray can follow a ray casting rule set to cast rays. Examples of ray casting rule sets include a "normal" ray casting rule set, a "limited" ray casting rule set, a "downward" ray casting rule set, a "remote" ray casting rule set, an "anchored" ray casting rule set, a "forward" ray casting rule set, a "curved" ray casting rule set, and a "sphere" ray casting rule set.

The "normal" ray casting rule set can specify a ray originating from a control point, for example, at a user's hand, fingertips, or from a controller, extending along a line, e.g., defined by A) the control point to the user's wrists or B) a center line of the controller, etc. The ray can be a single, straight line of infinite length or a length continuing until it intersects with an object. The "limited" ray casting rule set can specify a ray in the same manner as the normal ray casting rule set, except the ray is only a fixed length (e.g., 3 feet, 5 feet, 10 feet, 15 feet, etc.) The "curved" ray casting rule set can operate like the normal ray casting rule set, except that the line emanating from the origin point is curved (e.g., downward) by a specified curvature. The "sphere" ray casting rule set can specify the line of a traditional ray will be replaced with a sphere fixed to the user's hand or controller.

The "downward" ray casting rule set can specify a ray originating from a control point (e.g., the controller or a point on the user's hand such as a center of her palm), that points down to be perpendicular with a floor plane or a plane defined as the bottom of a volume. In some implementations, instead of using the floor plane or bottom of the volume, this ray casting rule set can use another defined surface that the ray remains perpendicular to.

The "remote" ray casting rule set can operate similarly to the downward ray casting rule set, except that the ray's control point is on a specified surface and moves relative to the user's hand or controller which may be remote from the defined origin surface. In some implementations, the magnitude of the user's movements may be modified on the surface, such that large hand movements produce a smaller change in the ray control point or such that small hand movements produce a larger change in the ray control point. In some implementations, the user's hand movements can map to 2D left/right/forward/back movements to left/right/up/down movements of the ray control point.

The "anchored" ray casting rule set can specify a position of the ray based on an origin point and a control point. A line extending from the origin point through the control point can be set as the center of the ray. The origin point can be a tracked part of a user's body, such as a dominant eye, a hip, or a shoulder, and the control point can be a controller or part of a user's hand such as fingertips, a palm, a wrist, a forearm, or a fist. The "anchored" ray casting rules set can be combined with the normal, curved, sphere, or limited casting rule sets to define the type of ray.

The "forward" ray casting rule set can specify that rays are all perpendicular to an input surface. For example, if an input surface is a tablet, rays originate at the user's hand but are directed to be perpendicular to the surface regardless of an angle of the user's hand.

The above examples of ray casting rule sets are not exhaustive and, in fact, there are innumerable ray casting rules that can be set using the disclosed technology. Some additional examples of projection (e.g., ray) interaction systems that can be selected or customized using the disclosed technology are described in U.S. patent application Ser. No. 16/578,221, titled PROJECTION CASTING IN VIRTUAL ENVIRONMENTS, U.S. patent application Ser. No. 16/578,236, titled GLOBAL AND LOCAL MODE VIRTUAL OBJECT INTERACTIONS, U.S. patent application Ser. No. 16/578,240, titled THREE-STATE GESTURE VIRTUAL CONTROLS, U.S. patent application Ser. No. 16/578,260, titled VIRTUAL INTERACTIONS ATA DISTANCE, and U.S. patent application Ser. No. 16/661,945, titled 3D INTERACTIONS WITH WEB CONTENT, each of which is herein incorporated by reference in its entirety.

At block 516, process 500 can switch to or enable a short ray input mode in response to determining a target object is selected and is within the threshold distance. The short ray input mode provides a ray of a specified length for interacting with the target object. The specified length can be a user determined value or a system default value. For example, the specified length can be determined based on the arm span (e.g., a percentage value of the user's arm length) of the user, such as whether the target object is within arm's reach of the user. In some cases, the specified length is a dynamic value that changes based on factors such as the size of the target object or a distance between the user's hands. The short ray input mode can enable the user to interact with a nearby target object without the user's hand occluding the target object. In some cases, the short ray input mode can include casing a ray that extends, for a particular distance, along a line that intersects an origin point (e.g., in the user's palm) and a control point (e.g., between the user's thumb tip and index finger tip), ending at an interaction point (e.g., the point of the ray that contacts the target object). In some cases, the short ray can extend a set distance, such as 3, 6, or 12 inches, from the control point. In other cases, the distance can be dynamic, such as to extend the ray the distance from the user's hand to a selected target object or surface or based on the distance between the user's hands. In some implementations, the short ray can include an extension from the interaction point, showing the user where the short ray is pointing or to select a target object, even through the extension does not cause other interactions with objects. Additional details on short ray casting are provided below in relation to FIGS. 6-9.

Figure 6:
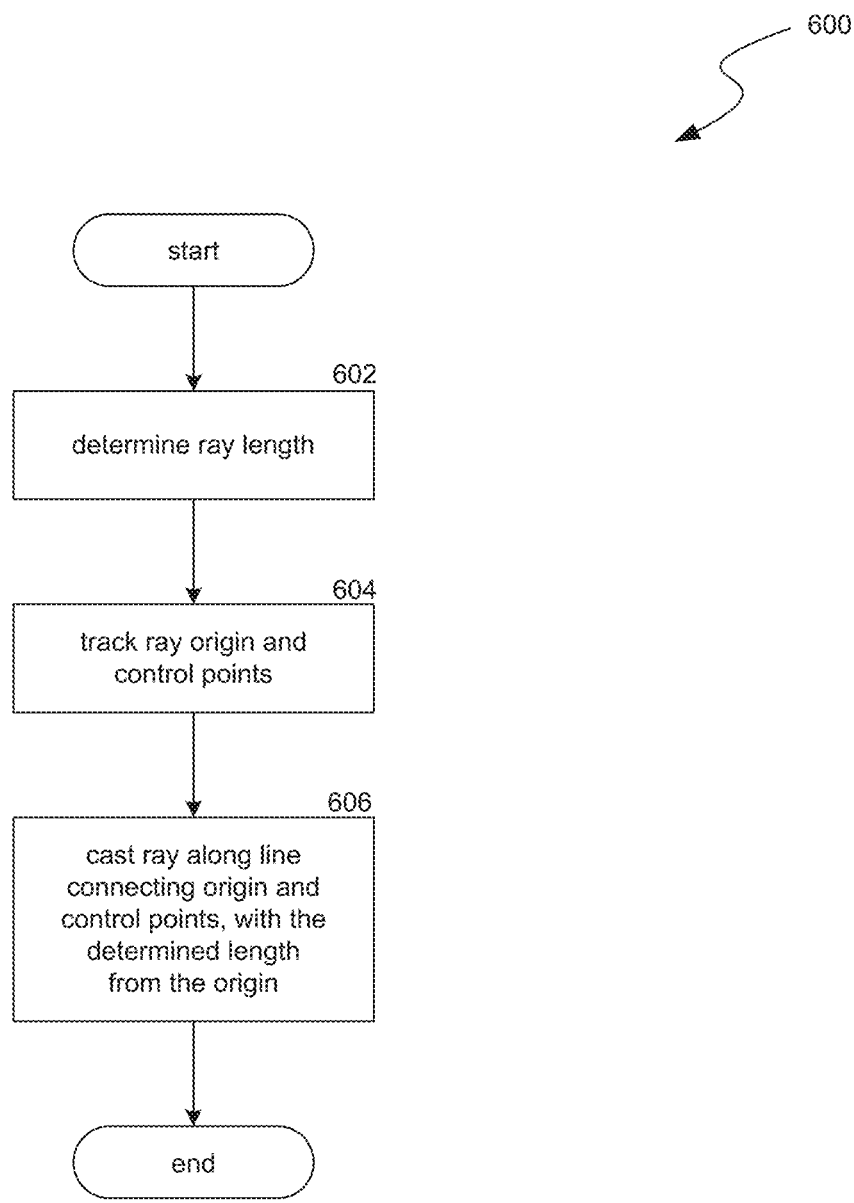
FIG. 6 is a flow diagram illustrating a process used in some implementations of the present technology for short ray casting.

FIG. 6 is a flow diagram illustrating a process 600 used in some implementations for short ray casting. Process 600 can be triggered by the selection of a short ray input mode (e.g., block 516 of process 500), where the short ray input mode is the default mode (e.g., when the user puts on an artificial reality headset), or where the short ray input mode is user selected, such as through an activation gesture by the user, a user pressing a button on a control device, a user voice command, etc. Process 600 can be performed locally on the artificial reality device or performed by cloud-based device (s) that can support user input mode selection.

At block 602, process 600 can determine a ray length. In some implementations, the ray length can be a default length or user set length (e.g., any length of distance, such as 1, 5, 8, 15 centimeters, etc.). In some implementations, the ray can be a dynamic length. For example, a user can select a target object and the ray length can be the distance from the user to the target object in the artificial reality environment. In another example, the dynamic length is based on the length between user's hand and the target object. In yet another example, the dynamic length is based on the distance between the user and closest object to the user. In another example, the dynamic length is based on a length between the user and a user-selected surface.

The short ray can be cast along a line connecting an origin point and a control point. In some implementations, a short ray can have an interaction point the user can use to interact with objects, where the interaction point is at the distance, from the control point, determined at block 602. At block 604, process 600 can track the origin point on the user hand and the control point (different from the origin point) on the user hand. The origin point can be e.g., the center of a palm, on knuckle of the user hand, where the thumb connects to the palm, or the midpoint between the index knuckle and the thumb knuckle. In some cases, the origin point can be an offset from one of the above points (e.g., center of palm offset by two inches toward the thumb).

Figure 7:
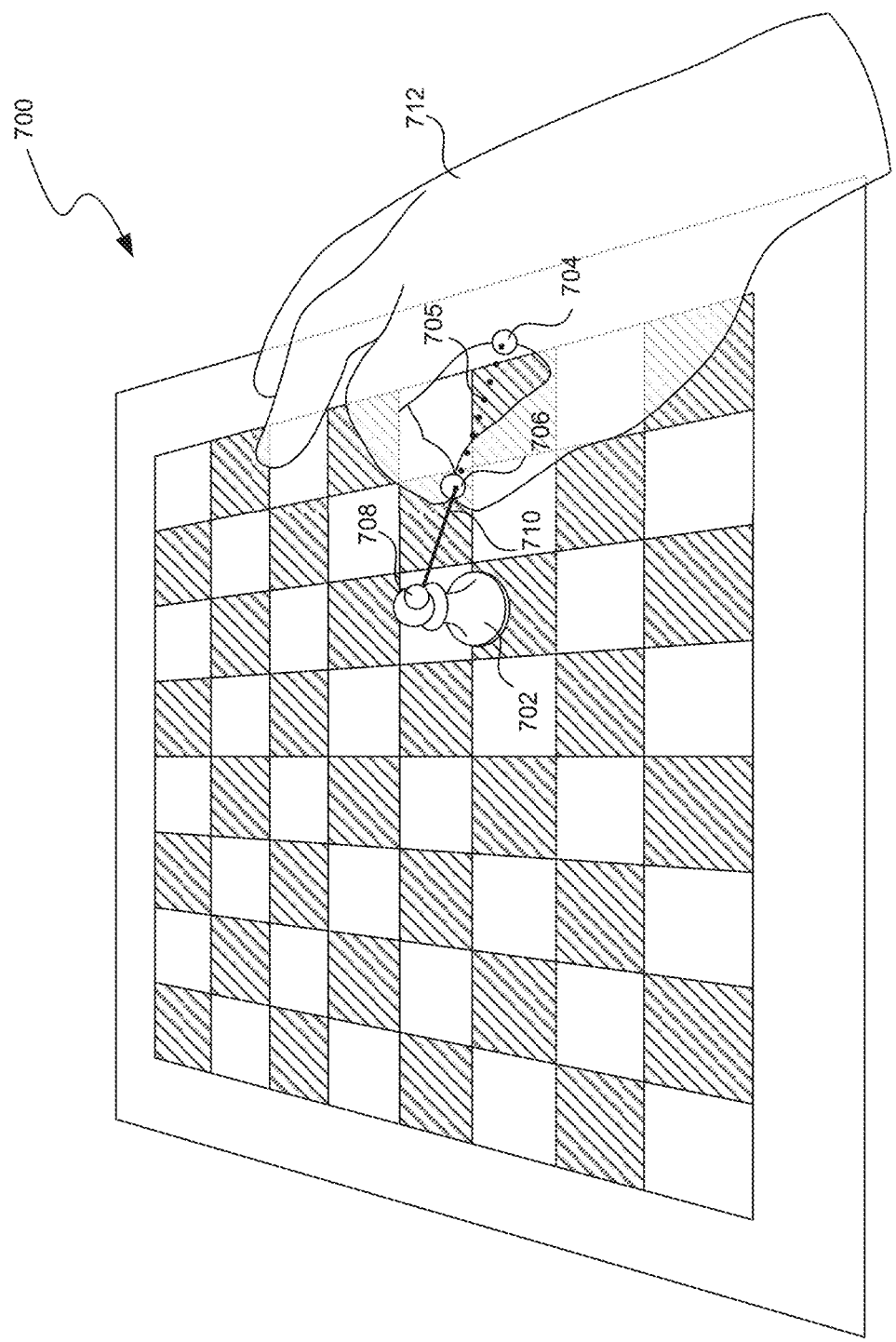
FIG. 7 is an illustration depicting a user selecting an object using a short ray input mode.

The control point can be the point the ray is cast out from the user (e.g., the user's fingertip). In an example, the control point can be the point where thumb tip touches another (e.g., index) fingertip. FIG. 7 illustrates example 700 in which ray 710 is cast from the pinch posture 712. Ray 710 is cast along a line 705 connecting the origin point 704, in the user's palm, through the control point 706. The ray 710 extends a specified distance of 3 inches outward from the control point 706 to the interaction point 708. A user can use ray 710 to contact the target object 702, performing actions with the interaction point 708.

Figure 8:
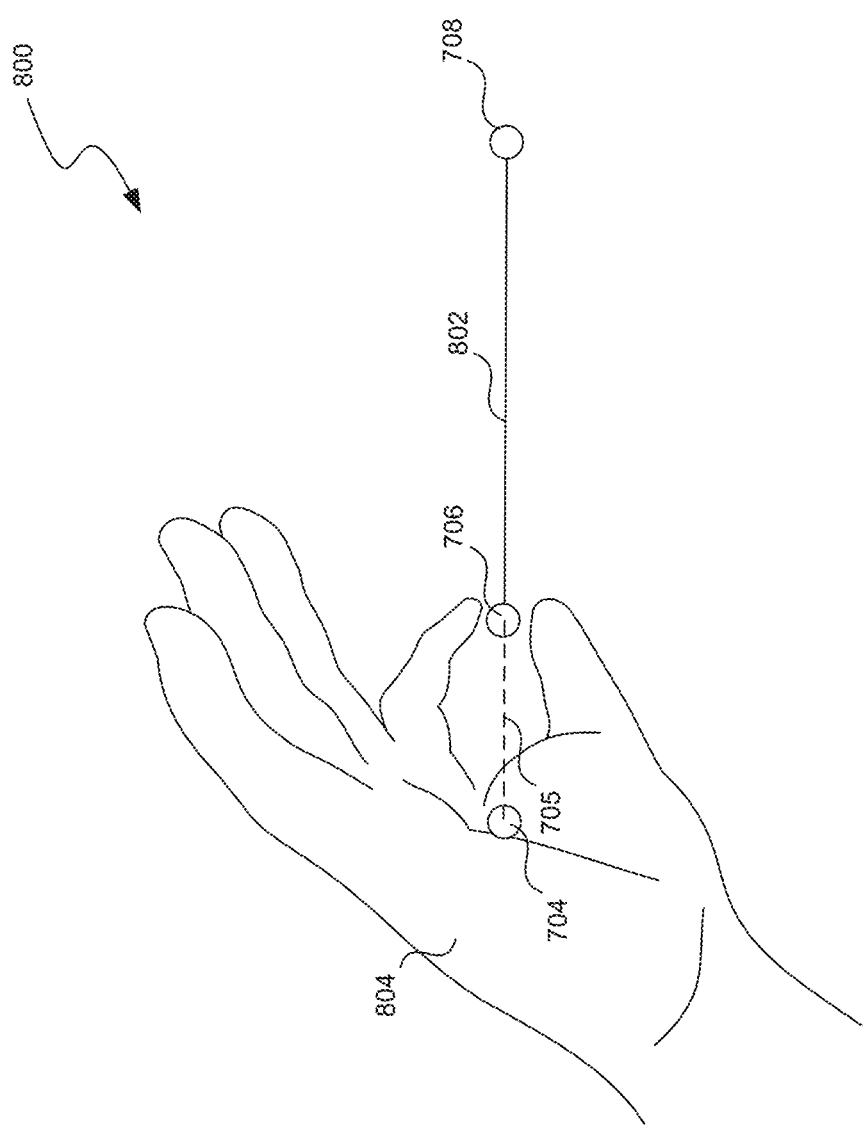
FIG. 8 is an illustration depicting a short ray controlled by origin and control points on a user hand in an input mode selection system.

In another example, when the ray casting gesture is an open pinch, the control point can be point between thumb tip and other (e.g., index) fingertip. FIG. 8 illustrates example 800 in which ray 802 is cast from the open pinch posture 804. Ray 802 is cast along a line connecting the origin point 704, in the user's palm, to the control point 706. The ray 802 extends a specified distance of 5 inches outward from the control point 706 to the interaction point 708. In another example, when the ray casting gesture is a point, the control point can be the tip of a pointing finger (e.g., index finger tip). In some cases, the origin point and the control point are the same location with a direction determined based on factors such as the ray being parallel to a portion of a finger and/or to a plane defined by the user's palm. The interaction point can be the point that touches the target object.

Process 600 can monitor for ray casting triggers such as ray postures, gestures, or actions (e.g., bringing finger and thumb together to indicate a "click"). Once a ray posture is detected, process 600 can cast the ray, of the specified length from block 602, from the control point to an interaction point, along a line connecting the origin point and the control point tracked at block 604. In some implementations, the user can interact with objects using the interaction point. In other implementations, any point of the ray that comes in contact with an object can be used to interact with the object.

Figure 9:
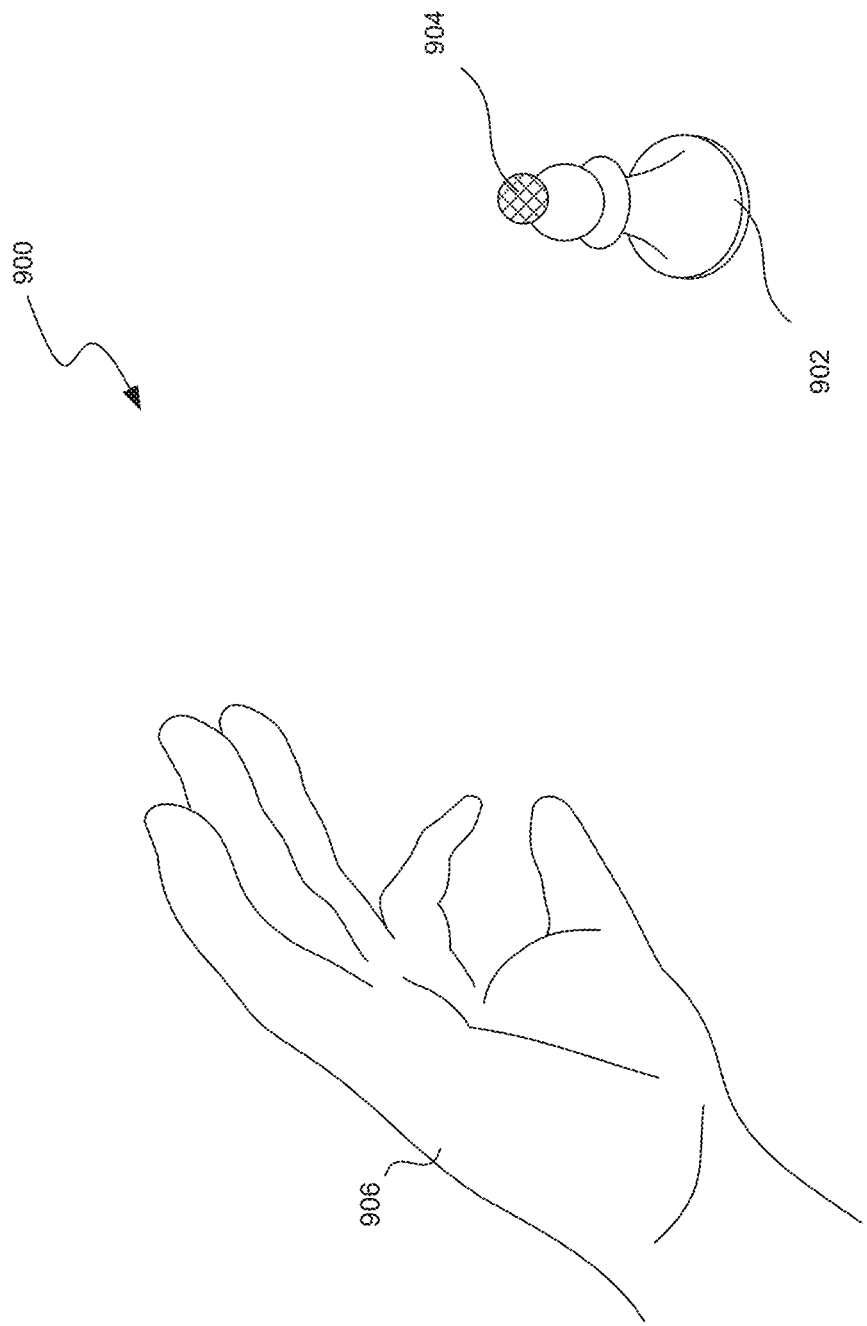
FIG. 9 is an illustration depicting an interaction point of a short ray from a user hand.

In some implementations, process 600 can display the interaction point of the ray without displaying the ray. For example, the ray is not displayed to the user (e.g., an actual line), and instead a dot or indicator is displayed at the end of the ray. FIG. 9 illustrates example 900 in which a ray is cast from a ray posture 906. The interaction point 904 is displayed at the target object 902, without displaying the origin point, the control point, or the ray. In other cases, process 600 can have different tools at the end of the short ray to manipulate the target object. For example, the tools can adjust, expand, highlight, or manipulate the target object. In some cases, the ray has an extension for selecting target objects when the target object is beyond the length of the default ray.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for input mode selection in artificial reality, the method comprising:
   identifying that a user hand is in view of one or more posture capturing cameras of an artificial reality (XR) device;
   monitoring hand positions of the user hand using one or more images captured by the one or more posture capturing cameras;
   identifying a hand posture of a user based on the monitoring the hand positions of the user;
   determining the hand posture is a ray posture, by determining that an identified gesture of the hand of the user is mapped to performing inputs with ray projections, wherein a target object has been selected through a previous user interaction performed prior to determining that the hand posture is in the ray posture;
   measuring a distance between the user and the previously selected target object, wherein the measuring is used to determine, while the hand posture is a ray posture, that the previously selected target object is within a threshold distance from the user, wherein the threshold distance from the user to the previously selected target object is a distance defined to determine the input mode to cast a ray; and
   in response to both the determining the hand posture is in the ray posture and the determining that the previously selected target object is within the threshold distance defined to determine the input mode to cast a ray, automatically enabling a short ray input mode by selecting the short ray input mode from among multiple available ray input modes available on the XR device, wherein the short ray input mode provides a ray of a specified length for interacting with the previously selected target object; and
   wherein the ray input mode selecting comprises selecting from among the multiple available ray input modes including the short ray input mode and a long ray input mode, wherein the long ray input mode provides a ray that is longer than the specified length and/or that extends until the ray intersects with an object.

2. The method of claim 1, wherein the specified length is a length between three and twelve inches.

3. The method of claim 1 further comprising:
   tracking an origin point on the user hand and a control point, different from the origin point, on the user hand; and
   casting the ray, of the specified length from the control point to an interaction point, along a line connecting the origin point and the control point.

4. The method of claim 1, wherein the selecting the short ray input mode from among multiple available ray input modes available on the XR device is performed by selecting the short ray input mode to transition to from a current input mode, wherein the selection of a short ray input mode includes each of:
   the identifying that the user hand is in view,
   the monitoring hand positions of the user,
   the identifying the hand posture of a user,
   the determining the hand posture is the ray posture, and
   the measuring the distance between the user and the previously selected target object.

5. The method of claim 4, wherein the current input mode is a default input mode.

6. The method of claim 1, wherein the hand posture of the user is a first hand posture of the user, and wherein the method further comprises:
   after enabling the short ray input mode:
      identifying a second hand posture of the user based on the monitoring the hand positions of the user;
      determining the second hand posture is not the ray posture;
      in response to the determining the second hand posture is not the ray posture, determining a second target object is within the threshold distance from the user; and
      in response to determining the second target object is within the threshold distance, enabling a direct hand input mode, wherein the direct hand input mode uses an intersection between the hand of the user and the second target object to move the second target object.

7. The method of claim 1, wherein the hand posture of the user is a first hand posture of the user, and wherein the method further comprises:
   after enabling the short ray input mode:
      identifying a second hand posture of the user based on the monitoring the hand positions of the user;
      determining the second hand posture is not the ray posture;
      in response to the determining the second hand posture is not the ray posture, determining a second target object is not selected or is not within the threshold distance from the user; and
      in response to determining the second target object is not selected or is not within the threshold distance, enabling a gaze input mode, wherein the gaze input mode uses eye gaze direction of the user to determine input direction.

8. The method of claim 1, wherein the previously selected target object is a first target object, the ray is a first ray, and the specified length is a first specified length, and wherein the method further comprises:

determining that a second target object is not within the threshold distance from the user; and in response to determining the second target object is not within the threshold distance, enabling a long ray input mode, wherein the long ray input mode provides a second ray of a second specified length, longer than the first specified length, for interacting with the second target object.

9. The method of claim 1 further comprising:
after enabling the short ray input mode:
   determining that the user hand is no longer in view of the one or more posture capturing cameras; and
   in response to determining the user hand is no longer in view of the one or more posture capturing cameras, enabling a gaze input mode, wherein the gaze input mode uses eye gaze direction of the user to determine input direction.

10. The method of claim 1 further comprising receiving the previous user interaction through a gaze selection by the user.

11. The method of claim 1 further comprising receiving the previous user interaction through a hand gesture selection by the user.

12. A computing system for input mode selection in artificial reality, the computing system comprising:
one or more processors; and
one or more memories storing instructions that, when executed by the one or more processors, cause the computing system to perform a process comprising:
   identifying that a user hand is in view of one or more posture capturing cameras of an artificial reality (XR) device;
   monitoring hand positions of the user hand using one or more images captured by the one or more posture capturing cameras;
   identifying a hand posture of a user based on the monitoring the hand positions of the user;
   determining the hand posture is a ray posture, by determining that an identified gesture of the hand of the user is mapped to performing inputs with ray projections, wherein a target object has been selected through a previous user interaction performed prior to determining that the hand posture in in the ray posture;
   measuring a distance between the user and the previously selected target object, wherein the measuring is used to determine, while the hand posture is a ray posture, that the previously selected target object is within a threshold distance from the user, wherein the threshold distance from the user to the previously selected target object is a distance defined to determine the input mode to cast a ray; and
   in response to both the determining the hand posture is in the ray posture and the determining that the previously selected target object is within the threshold distance defined to determine the input mode to cast a ray, automatically enabling a short ray input mode by selecting the short ray input mode from among multiple available ray input modes available on the XR device,
      wherein the short ray input mode provides a ray of a specified length for interacting with the previously selected target object; and
      wherein the ray input mode selecting comprises selecting from among the multiple available ray input modes including the short ray input mode and a long ray input mode, wherein the long ray input mode provides a ray that is longer than the specified length and/or that extends until the ray intersects with an object.

13. The computing system of claim 12, wherein the process further comprises:
   tracking an origin point on the user hand and a control point, different from the origin point, on the user hand; and
   casting the ray, of the specified length from the control point to an interaction point, along a line connecting the origin point and the control point.

14. The computing system of claim 12, wherein the hand posture of the user is a first hand posture of the user, and wherein the process further comprises:
after enabling the short ray input mode:
   identifying a second hand posture of the user based on the monitoring the hand positions of the user;
   determining the second hand posture is not the ray posture;
   in response to the determining the second hand posture is not the ray posture, determining a second target object is within the threshold distance from the user; and
   in response to determining the second target object is within the threshold distance, enabling a direct hand input mode, wherein the direct hand input mode uses an intersection between the hand of the user and the second target object to move the second target object.

15. The computing system of claim 12, wherein the hand posture of the user is a first hand posture of the user, and wherein the process further comprises:
after enabling the short ray input mode:
   identifying a second hand posture of the user based on the monitoring the hand positions of the user;
   determining the second hand posture is not the ray posture;
   in response to the determining the second hand posture is not the ray posture, determining a second target object is not selected or is not within the threshold distance from the user; and
   in response to determining the second target object is not selected or is not within the threshold distance, enabling a gaze input mode, wherein the gaze input mode uses eye gaze direction of the user to determine input direction.

16. The computing system of claim 12, wherein the previously selected target object is a first target object, the ray is a first ray, and the specified length is a first specified length, and wherein the process further comprises:
   determining that a second target object is not within the threshold distance from the user; and
   in response to determining the second target object is not within the threshold distance, enabling a long ray input mode, wherein the long ray input mode provides a second ray of a second specified length, longer than the first specified length, for interacting with the second target object.

17. A machine-readable storage medium having machine executable instructions stored thereon that, when executed by one or more processors, direct the one or more processors to perform a method for input mode selection in artificial reality, the method comprising:
   identifying that a user hand is in view of one or more posture capturing cameras of an artificial reality (XR) device;

monitoring hand positions of the user hand using one or more images captured by the one or more posture capturing cameras;

identifying a hand posture of a user based on the monitoring the hand positions of the user;

determining the hand posture is a ray posture, by determining that an identified gesture of the hand of the user is mapped to performing inputs with ray projections, wherein a target object has been selected through a previous user interaction performed prior to determining that the hand posture is in the ray posture;

measuring a distance between the user and the previously selected target object, wherein the measuring is used to determine, while the hand posture is a ray posture, that the previously selected target object is within a threshold distance from the user, wherein the threshold distance from the user to the previously selected target object is a distance defined to determine the input mode to cast a ray; and in response to both the determining the hand posture is in the ray posture and the determining that the previously selected target object is within the threshold distance defined to determine the input mode to cast a ray, automatically enabling a short ray input mode by selecting the short ray input mode from among multiple available ray input modes available on the XR device, wherein the short ray input mode provides a ray of a specified length for interacting with the previously selected target object; and wherein the ray input mode selecting comprises selecting from among the multiple available ray input modes including the short ray input mode and a long ray input mode, wherein the long ray input mode provides a ray that is longer than the specified length and/or that extends until the ray intersects with an object.

18. The machine-readable storage medium of claim 17, wherein the method further comprises:

tracking an origin point on the user hand and a control point, different from the origin point, on the user hand; and casting the ray, of the specified length from the control point to an interaction point, along a line connecting the origin point and the control point.

19. The machine-readable storage medium of claim 17, wherein the hand posture of the user is a first hand posture of the user, and wherein the method further comprises:

after enabling the short ray input mode:

identifying a second hand posture of the user based on the monitoring the hand positions of the user;

determining the second hand posture is not the ray posture;

in response to the determining the second hand posture is not the ray posture, determining a second target object is within the threshold distance from the user; and in response to determining the second target object is within the threshold distance, enabling a direct hand input mode, wherein the direct hand input mode uses an intersection between the hand of the user and the second target object to move the second target object.

20. The machine-readable storage medium of claim 17, wherein the hand posture of the user is a first hand posture of the user, and wherein the method further comprises:

after enabling the short ray input mode:

identifying a second hand posture of the user based on the monitoring the hand positions of the user;

determining the second hand posture is not the ray posture;

in response to the determining the second hand posture is not the ray posture, determining a second target object is not selected or is not within the threshold distance from the user; and in response to determining the second target object is not selected or is not within the threshold distance, enabling a gaze input mode, wherein the gaze input mode uses eye gaze direction of the user to determine input direction.

* * * * *